United States Patent

[11] 3,624,213

| [72] | Inventor | Max A. Cherkas<br>Philadelphia, Pa. |
|---|---|---|
| [21] | Appl. No. | 319,988 |
| [22] | Filed | Oct. 30, 1963 |
| [45] | Patented | Nov. 30, 1971 |
| [73] | Assignee | Merck & Co., Inc.<br>Rahway, N.J. |

[54] METHOD OF STERILIZING AQUEOUS PHARMACEUTICAL SOLUTIONS EMPLOYING PROPYLENE OXIDE AND ENTRAINED AIR
3 Claims, No Drawings

[52] U.S. Cl. .................................................. 424/177,
424/181, 424/238, 424/273, 424/346, 424/358,
21/58
[51] Int. Cl. .......................................................... A61l 1/00,
A61k 27/00

[50] Field of Search............................................. 167/50, 58,
22; 21/57, 58; 99/155; 424/177, 181, 238, 273,
346, 358

[56] References Cited
UNITED STATES PATENTS

| 1,920,639 | 8/1933 | Haraldson ................... | 167/58 |
| 2,354,014 | 7/1944 | Haines.......................... | 99/155 |
| 2,446,505 | 8/1948 | Arenson....................... | 167/22 |
| 3,035,886 | 5/1962 | Hickey ......................... | 21/57 |

*Primary Examiner*—Albert T. Meyers
*Assistant Examiner*—Vincent D. Turner
*Attorneys*—Erma R. Coutts, Raymond Underwood and Paul and Paul

ABSTRACT: Aqueous pharmaceutical preparations which are to be bottled are first sterilized by adding propylene oxide to the liquid and blowing air through it to convert it to propylene glycol which destroys microorganisms.

METHOD OF STERILIZING AQUEOUS PHARMACEUTICAL SOLUTIONS EMPLOYING PROPYLENE OXIDE AND ENTRAINED AIR

This invention relates to a method for sterilization of aqueous fluids, and relates more sterilization of aqueous fluids, and relates more specifically to the sterilization of an aqueous fluid containing an active pharmaceutical ingredient, wherein propylene oxide is incorporated into the aqueous ingredient of the solution, the active ingredient or ingredients may then be added, and wherein air is entrained throughout the resulting solution in order to convert the propylene oxide to the corresponding glycol in situ.

Sterilization utilizing ethylene oxide and propylene oxide is well known. When ethylene oxide is used in solution, it is ordinarily dissolved in ethylene glycol or ethyl alcohol. Similarly, it has heretofore been suggested to incorporate propylene oxide into solutions of 95 percent ethyl alcohol, absolute alcohol or propylene glycol.

It is an object of this invention to provide an extremely quick and effective method for sterilizing aqueous fluids, particularly those which cannot be sterilized by either filtration or heat.

Still another object of this invention is to provide a simple, safe and economical method of sterilization which eliminates the need for costly and cumbersome sterilizing equipment, such as that utilized in conjunction with sterilizing gases such as ethylene oxide, for example.

Still another object of this invention is to provide a method for autosterilization of pharmaceutical fluids in situ, which is simply achieved during the course of the product processing cycle, without requiring additional time and with a maximum of convenience and minimum of expense. Other objects and advantages of this invention will further appear hereinafter.

In accordance with this invention it has been discovered that the sterilization of an aqueous fluid containing an active pharmaceutical ingredient can be carried out with ease, rapidity and reliability by dissolving about 1 percent by weight of propylene oxide in water, adding the active ingredient to the resulting aqueous propylene oxide solution, and then entraining air in the resulting solution, which converts the propylene oxide to the corresponding glycol in situ.

The proportions of propylene oxide utilized in accordance with this invention are important. If less than 1 percent by weight is utilized, inconsistent sterilization results are obtained. If greater than 1 percent by weight of propylene oxide is utilized, this offers no advantage and is simply wasteful of propylene oxide.

EXAMPLE 1

In accordance with this invention, 1 kilogram of propylene oxide may be dissolved in 100 kilograms of distilled water, and the following ingredients added:

| | |
|---|---|
| Pilocarpine hydrochloride | 1.00 kg. |
| Hydroxyethyl cellulose | 2.50 kg. |
| Sodium citrate | 1.00 kg. |
| Creatinine | 0.25 kg. |
| Polysorbate 80 | 0.20 kg. |
| Phenylethyl alcohol | 0.50 kg. |
| Sorbitol solution 70% | 5.00 kg. |

The resulting solution is slightly cloudy. Clarification is accomplished by centrifugation utilizing a Sharples centrifuge or the equivalent. This may be the open type, for example, with a separator bowl and 3-wing assembly inserted. A small diameter needle is incorporated in the inlet nozzle.

A feed pressure of 10–12 pounds of air, for example, is sufficient. The solution is thereby quickly clarified.

The clarified effluent is collected into clear particle-free containers. Sterility tests performed on the bulk by the method described in the U.S. Pharmacopia, XVI, pages 855–859, demonstrated that the solution was sterile The solution was tested also by the method described in Analytical Chemistry 27: 1435 (1955) which demonstrated that all propylene oxide had been converted to propylene glycol. Having achieved satisfactory sterility and innocuity tests, the formulation is filled into market containers.

EXAMPLE 2

| | |
|---|---|
| Dexamethasone-21-phosphate | 1.00 kg. |
| Propylene oxide | 1.00 kg. |
| Hydroxyethylcellulose QP 4400 | 2.50 kg. |
| Sodium citrate | 1.00 kg. |
| Creatinine | 0.25 kg. |
| Polysorbate 80 | 0.20 kg. |
| Phenylethyl alcohol | 0.50 kg. |
| sorbitol solution 70% | 5.00 kg. |
| Distilled water qs | 100.00 kg. |

This formulation is prepared in a manner similar to that discussed in connection with example 1, the propylene oxide being first dissolved in the aqueous phase and the remaining ingredients added and dissolved. The formulation is then brought to yield with distilled water and clarification is accomplished by centrifugation utilizing the Sharples centrifuge open type with a separator bowl and 3-wing assembly inserted, and using a small diameter needle in the inlet nozzle. Feed pressure was 10–12 pounds of air. When tested by methods described above, the solution was found to be sterile and that all propylene oxide had been converted to glycol.

EXAMPLE 3

| | |
|---|---|
| Neomycin sulfate | 0.50 kg. |
| Dexamethasone-21-phosphate | 0.50 kg. |
| Hydroxyethylcellulose QP 4400 | 2.50 kg. |
| Sodium citrate | 1.00 kg. |
| Creatinine | 0.25 kg. |
| Polysorbate 80 | 0.25 kg. |
| Phenylethyl alcohol | 0.50 kg. |
| Sorbitol solution 70% | 5.00 kg. |

The above ingredients were added to 100 kilograms of distilled water containing 1 kg. of propylene oxide and sterilization effected in a manner similar to that discussed above in connection with example 2. Tests according to the procedures identified in example 1 established the solution to be sterile and free of propylene oxide.

EXAMPLE 4

| | |
|---|---|
| Tyrothricin | 1.00 kg. |
| Hydroxyethylcellulose QP 15,000 | 2.00 kg. |
| Sodium citrate | 1.00 kg. |
| Creatinine | 0.25 kg. |
| Polysorbate 80 | 0.20 kg. |
| Phenylethyl alcohol | 0.50 kg. |
| Sorbitol solution 70% | 5.50 kg. |

This formulation was successfully prepared and sterilized using the method of example 1. Tests according to the procedures identified in example 1 established the solution to be sterile and free of propylene oxide.

EXAMPLE 5

| | |
|---|---|
| Hexylresorcinol | 1.00 kg. |
| Hydroxyethylcellulose, QP 4400 | 2.50 kg. |
| Sodium citrate | 1.00 kg. |
| Creatinine | 0.25 kg. |
| Polysorbate 80 | 0.20 kg. |
| Phenylethyl alcohol | 0.50 kg. |
| Sorbitol solution 70% | 5.00 kg. |

This formulation was successfully prepared and sterilized using the method of example 1. Tests according to the procedures identified in example 1 established the solution to be sterile and free of propylene oxide.

It will be appreciated that similar examples of sterilized solutions may be prepared using combinations of the above identified active ingredients, together with numerous other agents of therapeutic value.

It will be understood further that, by replacing the hydroxyethyl cellulose with other suitable thickening agents, an increase in viscosity may be obtained if desired. Such agents include methylcellulose, sodium carboxymethylcellulose, acacia, gelose, polyvinylpyrrolidone, polyvinyl alcohol, tragacanth, polyoxyethylene water soluble resins and the like.

It is an important and advantageous feature of this invention that autosterilization plus rapid conversion in situ of the propylene oxide to the nontoxic glycol is brought about by the entrainment or entrapment of air throughout the aqueous solution. Although this has been disclosed as being performed by passage of the complete formulation through a centrifuge, air entrapment may be achieved in wide variety of ways. Such air entrapment is enhanced when the formulation contains a surface active agent or thickener, film former, blinder or dispersant such as hydroxyethylcellulose and others of the agents just referred to herein.

It will be appreciated that the efficient and effective action obtained in accordance with this invention may also be obtained by substituting equivalent thickeners for those specifically referred to. Further, it will be appreciated that other substitutions and alterations may be made, all without departing from the spirit and scope of this invention as defined in the appended claims.

What is claimed is:

1. A method for the preparation of a sterile aqueous solution containing an active pharmaceutical ingredient prior to the time that it is filled into market containers comprising the steps of
    1. dissolving at least one percent by weight of propylene oxide in water,
    2. adding an active pharmaceutical ingredient to the resultant solution of step (1), and
    3. subsequently entraining air throughout the resultant solution of step (2) whereby autosterilization of said step (2) solution occurs and said propylene oxide is converted in situ to propylene glycol.

2. The method of claim 1 wherein said air entrainment is accomplished by centrifugation of the resultant solution of step (2).

3. The method of claim 1 wherein step (2) additionally includes adding a thickening agent to the resultant solution of step (1).

* * * * *